United States Patent [19]
Takahashi et al.

[11] Patent Number: 5,185,887
[45] Date of Patent: Feb. 9, 1993

[54] DATABASE GENERATION MANAGEMENT METHOD AND SYSTEM

[75] Inventors: Noriyuki Takahashi, Sakai; Kazunori Nishizawa, Yokohama; Rinichi Takashi, Yokohama; Naofumi Sakai, Yokohama; Yukiharu Tanabe, Okayama; Nobuhiro Yasue, Isehara, all of Japan

[73] Assignees: Hitachi, Ltd.; Hitachi Software Engineering Co., Ltd., Tokyo, Japan

[21] Appl. No.: 547,512

[22] Filed: Jul. 2, 1990

[30] Foreign Application Priority Data

Jul. 6, 1989 [JP] Japan ................... 1-175200
Sep. 11, 1989 [JP] Japan ................... 1-232846

[51] Int. Cl.[5] ........................................ G06F 15/403
[52] U.S. Cl. ........................... 395/600; 364/282.3; 364/974.0
[58] Field of Search .................. 395/600 MS File

[56] References Cited
U.S. PATENT DOCUMENTS

| 4,422,145 | 12/1983 | Sacco | 395/600 |
|---|---|---|---|
| 4,479,196 | 10/1984 | Ferrer et al. | 395/600 |
| 4,514,826 | 4/1985 | Iwata et al. | 395/600 |
| 4,627,019 | 12/1986 | Ng | 395/600 |
| 4,631,664 | 12/1986 | Bachman | 395/600 |
| 4,769,772 | 9/1988 | Dwyer | 395/600 |
| 4,811,207 | 3/1989 | Hikita | 395/904 |
| 4,819,160 | 4/1989 | Tanka | 395/600 |
| 5,010,478 | 4/1991 | Deran | 395/600 |

FOREIGN PATENT DOCUMENTS 61-243541 4/1985 Japan.

Primary Examiner—David Y. Eng
Attorney, Agent, or Firm—Fay, Sharpe, Beall, Fagan, Minnich & McKee

[57] ABSTRACT

In a data-base system including a data-base management system, a dictionary device for managing definition information and generation management information in a data base, and a dictionary file for storing the generation management information, a generation management system is provided between the data-base management system and a data storage file to acquire data in accordance with the generation management information, the dictionary device is made independent of the data-base management system and connected to an input/output device, the dictionary file and the data-base management system, new or update generation management information is registered in the dictionary file by means of the dictionary device when the new or update generation information classified for each item is designated through the input/output device while the timing for acquiring the generation information is designated suitably, and the data-base management system is operated to issue a data-base output request to the generation management system based on the generation management information registered in the dictionary file to thereby make the generation management system read out data from the data base in accordance with the registered generation management information to supply the read-out data to the designated data storage file.

9 Claims, 6 Drawing Sheets

| FIELD | LENGTH | ATTRIBUTE | INTERVAL | ACQUIRE-MENT POSITION | STORAGE POSITION | EFFECTIVE PERIOD |
|---|---|---|---|---|---|---|
| 121 | 122 | 123 | 124 | 125 | 126 | 127 |
| GOODS CODE | 5 | C | KEY | JOURNAL | FILE 1 | — |
| UNIT PRICE | 5 | I | ONCE A YEAR | JOURNAL | FILE 1 | — |
| TOTAL SHIPMENT | 3 | I | TWICE A DAY | MEMORY | FILE 2 | — |
| TOTAL STOCK | 10 | I | TWICE A DAY | MEMORY | FILE 2 | — |

← DATA BASE DEFINITION INFORMATION → ← GENERATION MANAGEMENT INFORMATION →

DATABASE GENERATION MANAGEMENT METHOD AND SYSTEM

BACKGROUND OF THE INVENTION

The present invention relates to a data-base generation management technique, and, particularly, relates to a data-base generation information management method and system in which generation information is acquired by designation in a dictionary device to thereby select a storage corresponding to the level of the generation information or select an extracting means corresponding to the level of the generation information.

The necessity of managing generation information in a data base has become important with the advance of increase in scale of the data base and with the advance of diversification of the data base. In general, generation information becomes massive according to the unit for acquirement thereof. Accordingly, it is necessary to manage generation information efficiently.

In a conventional data-base system, a user application program issues a processing request using a data description language to a data base which is connected under a data-base management system (DBMS). In the conventional system, the DBMS includes a dictionary device for updating or sending out generation management information. Accordingly, generation management information must be indirectly updated or designated through starting the dictionary device according to the request from the application program. In other words, the user could not directly update or designate generation management information. In general, time-series data caused by updating are stored and managed over a plurality of generations in order to protect periodically updated data sets, that is, data files, from destruction caused by a disaster, an accident or an operation error or make the data recoverable. This management is called "generation management". The time-series data are called "generation information". For the double purpose of storage and management, a generation number is given to each generation in a generation data set group by using a catalogue management function of an operating system (OS). The generation number is classified into two, namely, the absolute generation and version number and the relative generation number, as shown, by way of example, in the type VOS3 of Hitachi's OS.

As a conventional generation information management method, a time-series data file management type method in which data are managed by means of "wrap around" using both a time-series data acquirement time and a predetermined acquirement interval decided in advance is described in JP-A-61-243541. Assuming now that the initial time of acquirement of a time-series data is replaced by $T_0$ and that data are successively acquired at an acquirement interval $t_0$, the number N of a data acquired at an arbitrary time $T_i$ is calculated by the formula $N=(T_i-T_0)/t_0$. Accordingly, the time-series data at a desired time can be picked up from the data base exactly and rapidly by providing a base time designating device, a time-to-number converter and a divider.

In the conventional method disclosed in the above Publication, the management method is carried out logically in a program. There arises a problem in that once designated numerical parameters for time and interval cannot be changed with no modification of the program. In short, the time-series data (generation information) must be picked up at a predetermined interval. Further, the factors for generation management, such as an interval, a storage position, an integral effective period and the like, are fixed to constant values, respectively. Accordingly, waiting for a predetermined interval is required for picking up data, so that the data cannot be picked up at an arbitrary time correspondingly to the necessity. In addition, the acquirement method corresponding to the level of the data as to whether or not the data is to be seen soon cannot be provided.

SUMMARY OF THE INVENTION

An object of the present invention is to provide a data-base generation management method and system in which generation information in a data base can be managed so dynamically as to be acquired at any suitable time and in which a plurality of generations can be managed generally.

Another object of the invention is to provide a data-base generation management method and system in which a generation information acquirement method selected corresponding to the level of data can be employed to thereby carry out the acquirement method smoothly.

To attain the foregoing objects, according to an aspect of the present invention, provided are a data-base generation management method and a system therefor which have features in that, in a data-base system comprising a data-base management system, a dictionary device for managing generation management information in a data base, and a dictionary file for storing or accumulating the generation management information, in that a generation management system is provided between the data-base management system and a data storage file to acquire data according to generation information, in that the dictionary device is provided separately from the data-base management system and connected to the dictionary file, the data-base management system, and a display unit which constitutes a dialogical type input/output device for a user, the dictionary file and the data-base management system, so that when generation management information is designated by item through the display unit, the designated generation management information is registered as new or updated generation management information in the dictionary file from the dictionary device while the timing for acquiring the generation management information is designated suitably, and in that the data-base management system is operated to issue a data-base output request to the generation management system based on the generation management information registered in the dictionary file so that the generation management system reads out data from the data base according to the registered generation management information and supplies the read-out data to the designated data storage file.

Preferably, the aforementioned dictionary device includes program means for changing the connection of the data storage file according to the item and generation management level of the registered generation management information by performing update designation of the data storage file, when the generation management information of the data base is registered as new or updated generation information.

Preferably, the afore-mentioned generation management system includes a program means for storing the registered generation information in an extension memory or an IC disk included in the dictionary device in advance and for transferring the registered generation information from the extension memory or the IC disk to a large-capacity optical disk as a data storage file at a predetermined point of time.

Preferably, the dictionary device includes program means for changing an interval value which is provided in the registered generation management information to determine an interval of data acquisition, corresponding to the capacity of the connected data storage file.

Preferably, the dictionary device includes program means for generalizing the unit of generation information call in the form of knowledge information so that year data, for example, from April to March, can be taken out in response to the call of year and for indicating a generation acquirement status.

Preferably, the dictionary device includes program means for distributing and managing data itemized by the generation information, into local files through a network, and for reserving an undescribed record such as a recorder journal (log) in the form of generation information.

Thus, according to present invention, the dictionary device which has been conventionally provided in the inside of the data-base management system is provided in the outside of the system so as to be independent system, so that access to the dictionary file having generation information stored therein can be made by designation operation by the user through a keyboard included in a console type display unit, and the contents of the generation information can be indicated on the display unit and can be updated freely. By providing the generation management system newly, the generation management information of the data base can be read through the dictionary device based on a request issued from the data-base management system to the generation management system. The generation information can be acquired and stored in accordance with the designation. Accordingly, by designation of the generation information to be acquired by item and by designation of the timing for acquirement of the generation information at a predetermined time, the data base can be stored in the file at the acquirement time.

According to another aspect of the invention, the data-base generation information management system comprises a data dictionary device for managing generation information in a data base, means for designating generation information acquirement timing (acquirement time and acquirement interval) in generation management information registered by the data dictionary device, means for holding update data acquired in the data-base management system, means for extracting necessary generation information from the update data, and means for storing the extracted generation information, the extraction timing of the generation information extracted by the extraction means being controlled based on the generation information acquirement timing designated by the designation means.

The acquirement timing designation means is constituted so as to designate the generation information acquirement position in addition to the aforementioned generation management information; and the update data storing means includes a data-base buffer for temporarily storing update data obtained in the data-base management system at the time of execution of on-line operation, and a journal (log) file for storing a journal (log) obtained in the data-base management system, by which the generation information is extracted through selected one of the data-base buffer and the journal (log) file according to the designated generation information acquirement position.

The operation of the invention based on the aforementioned configuration is described.

The data dictionary device for managing generation management information so that generation management information for designation of generation information acquirement conditions such as acquirement timing (interval) and the like can be registered in the data dictionary device to thereby make it possible to acquire/extract the generation information according to the designated conditions. Accordingly, the acquirement time and acquirement interval of the generation information can be adjusted freely. Compared with the case where the acquirement conditions are determined logically in a program, the user can update the acquirement conditions easily only by changing the definition of the data dictionary.

Further, the generation information can be acquired and extracted not only through the journal but through the data-base buffer under on-line execution. Furthermore, by designating both acquirement time and position of the generation information based on the generation management information, the generation information can be acquired and extracted correspondingly to the level as to whether or not the generation information must be seen rapidly. In short, the generation information which must be seen frequently (rapidly) can be acquired and extracted through the data-base buffer and, on the other hand, the generation information which need not be seen frequently (rapidly) can be acquired and extracted through the journal file.

The generation information storing means in this embodiment can be constituted by a high-speed small-capacity file and a low-speed large-capacity file. In this case, the low-speed large-capacity file is used for storing information which need not be referred to frequently (for example, one or less in a year) or is used for transferring information when the high-speed small-capacity file is full in the capacity thereof.

BRIEF DESCRIPTION OF THE DRAWINGS

Other features and advantages of the present invention will be apparent from the following description taken in connection with the accompanying drawings, wherein:

FIG. 5 is a diagram showing an example of the generation management information format;

FIGS. 6 and 7 are flow charts respectively showing examples of a generation information acquirement method and a generation information extracting method, in which FIG. 6 is a flow chart of a generation information acquirement method, and FIG. 7 is a flow chart for explaining a method for extracting generation information from a memory (or data-base buffer)

DESCRIPTION OF THE PREFERRED EMBODIMENTS

Embodiments of the present invention will be described in detail with reference to the accompanying drawings.

Figure 1:
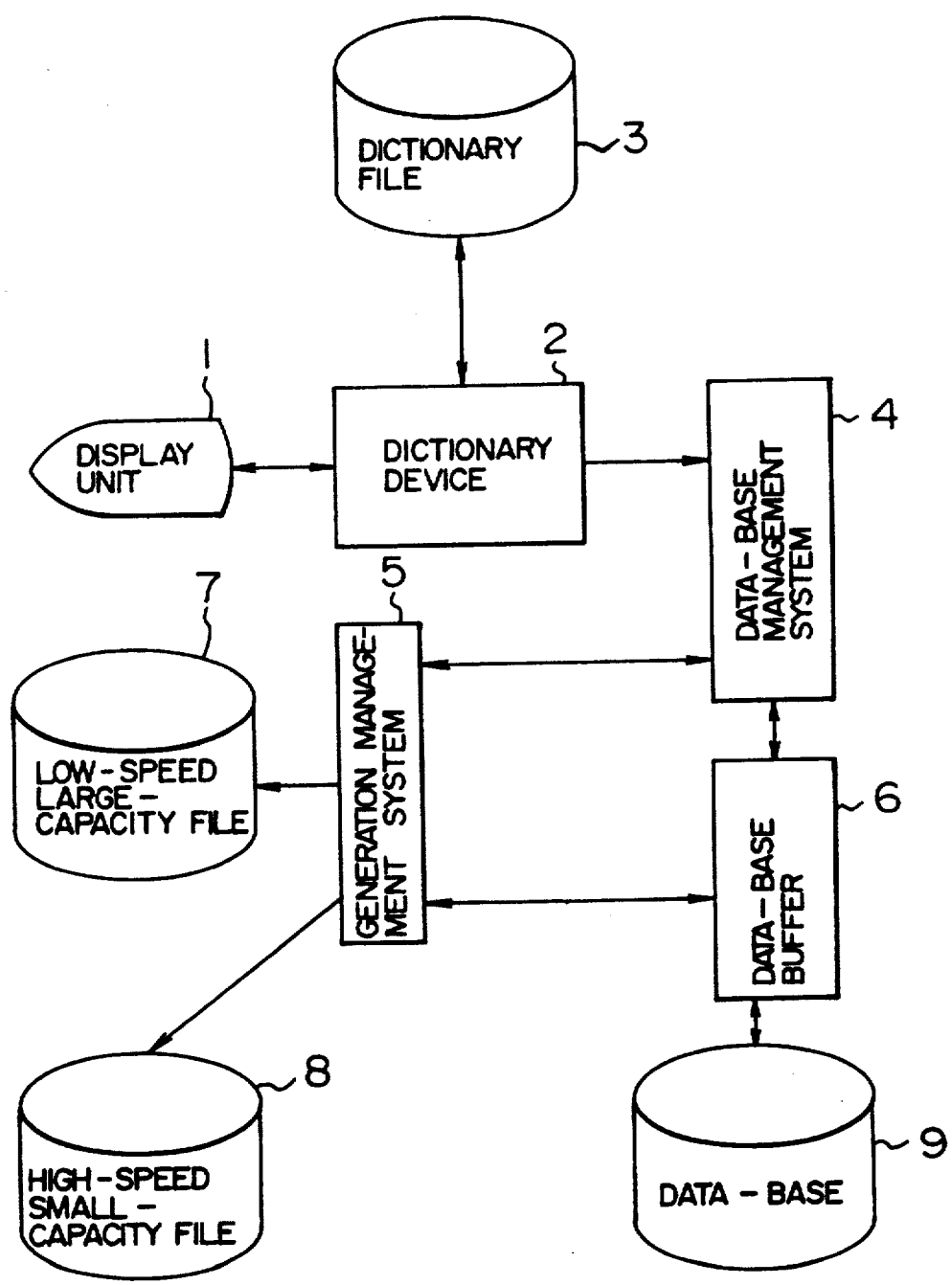
FIG. 1 is a block diagram of a data-base system for performing generation management, showing an embodiment of the present invention.

FIG. 1 is a block diagram of a data-base system, showing an embodiment of the present invention.

In FIG. 1, the data-base system includes: a display unit 1 provided in combination with a keyboard to constitute a console; a dictionary device 2 for accessing a dictionary based on a designation from a user to read generation management information so as to indicate it on the display unit 1 or update it; a dictionary file 3 for storing information management information; a data-base management system 4 for managing a data base; a generation management system 5 for supplying data stored in a data base to a designated file according to the generation management information in the dictionary file 3; a data base 9 including one or more files and directed to improve the efficiency in searching and updating; a data-base buffer 6 for storing copies of data which are read frequently; a low-speed large-capacity data file 7 such as a disk for storing generation information acquired; and a high-speed small-capacity data file 8 such as a cache storage for storing generation information acquired.

In FIG. 1, the generation management 5, the high-speed small-capacity file 8 and the dictionary device 2 are newly provided according to this embodiment. The dictionary device 2 is provided outside the data-base management system 4 separately therefrom by taking out a function included in the conventional data-base management system. The dictionary device 2 has a new function in which the user can directly freely conduct reading and updating of generation information. Both the low-speed and high-speed files 7 and 8 which have been conventionally connected directly to the data-base management system 4 are connected to the generation management system 5 so that necessary data classified by contents as to generation information can be taken out under the control of the system 5.

Generation information in a data is registered as follows. The user sends a request from the display unit 1 to the dictionary device 2 to call definition information of the data base for generation management from the dictionary file 3. The dictionary device 2 makes access to the dictionary 3 to read predetermined definition information in generation management information in the data base and includes it on the display unit 1. The user designates generation management information on the basis of the definition information indicated on the display unit 1 and registers the generation management information in the dictionary file 3 through the dictionary device 2. The data-base definition information includes record items, such as the name number, the name, the age, the salary, the family size, the service length, and the like, and other items, such as the character length corresponding to the respective record item, the attribute, and the like. The generation management information is information for generation management of the data base defined by the respective definition information. The generation management information includes items such as the filing interval (period), the storage position (file), the effective keeping period, and the like.

The data-base management system 4 sends a request to the generation management system 5 based on the generation management information registered in the dictionary file 3, to feed the contents of the data base 9 stored in the data-base buffer 6 to the generation information files 7 and 8. Each of the data-base management system 4 and the generation management system 5 includes a program for executing its function, and a CPU for performing a predetermined processing through execution of the program.

When started through the data-base management system in accordance with an application program, the generation management system 5 receives generation management information, reads out predetermined data from the data-base buffer 6 according to the generation management information, and feeds the read-out data to the low-speed large-capacity file 7 or the high-speed small-capacity file 8 to store the data therein. The destination of generation information and the interval thereof can be registered through the dictionary device 2 by the user as described above to make suitable designation thereof possible. Further, the user can obtain the contents of the data base in an arbitrary data and time by designation of the destination of information and the interval through the dictionary device 2 from the keyboard of the display unit 1.

Generation management information is indicated and updated as follows. The user sends a request from the display unit 1 to the dictionary device 2 to indicate the generation management information. The dictionary device 2 calls the requested generation management information from the dictionary file 3 and indicates it on the display unit 1. For example, the acquirement interval value in the generation management information is updated as follows. The user selects the acquirement interval value from the generation management information indicated on the display unit 1 and changes it. When, for example, the interval of acquirement is to be changed from one year to two years, the interval value is updated from "2" to "2".

In the case where updating of information for acquirement of generation information is needed as described above, the information can be written in the dictionary file 3 through the dictionary device 2 by directly rewriting through the keyboard the contents indicated on the display unit 1.

Figure 2:
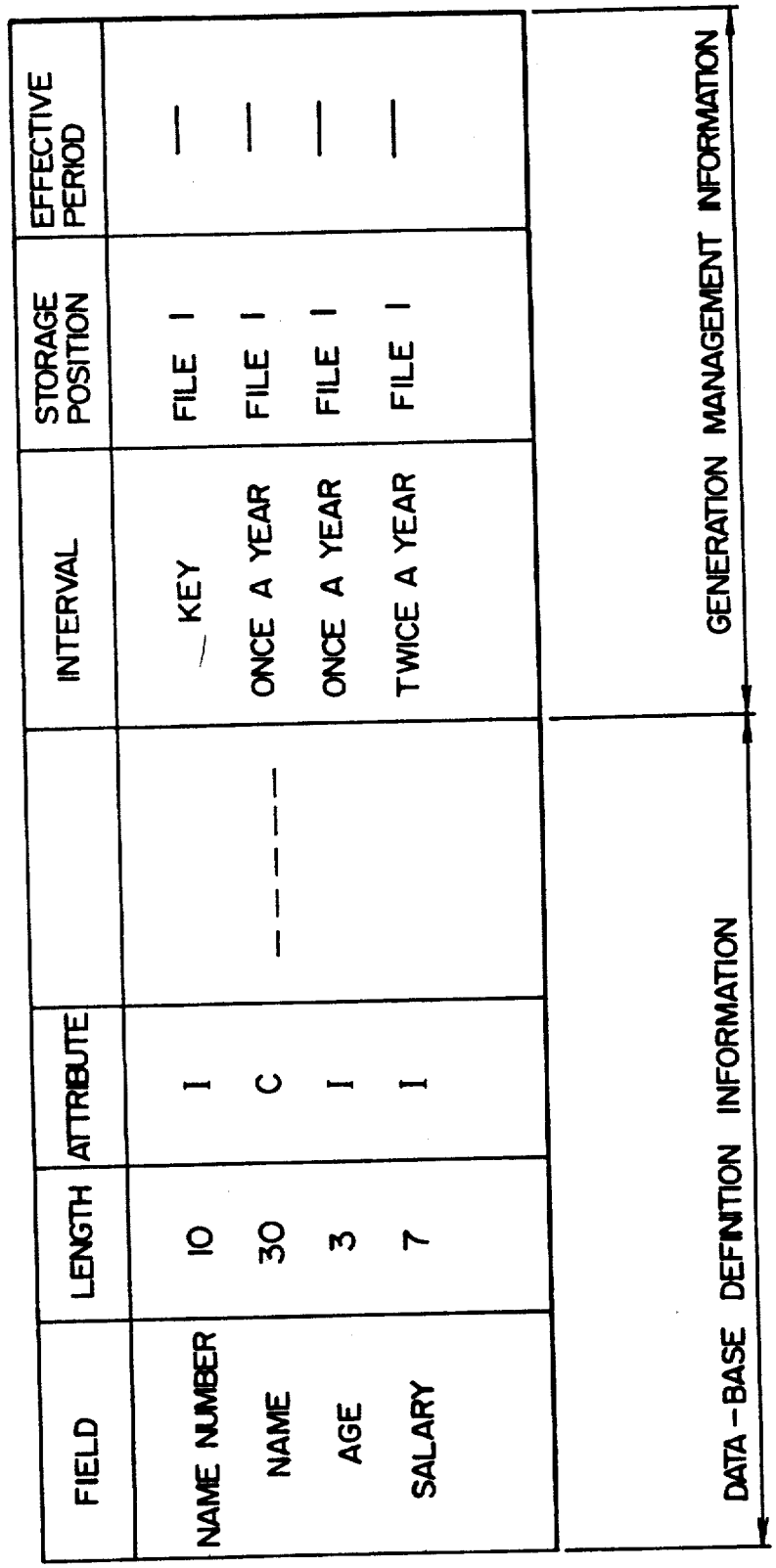
FIG. 2 is a diagram showing an example of the generation management information format in the generation management in FIG. 1.

FIG. 2 is a diagram showing an example of generation management information in the dictionary depicted in FIG. 1.

In this example, 'FIELD', 'LENGTH' and 'ATTRIBUTE' as data-base definition information and 'GENERATION ACQUIREMENT INTERVAL', 'STORAGE POSITION OF ACQUIRED DATA' and 'EFFECTIVE PERIOD' as generation management information corresponding to the definition information are designated as shown in FIG. 2. Assuming now that the field 'NAME NUMBER' shows a member number registered at the time of the joining of a company, the designated 'CHARACTER LENGTH', 'ATTRIBUTE', 'ACQUIREMENT INTERVAL', and 'STORAGE POSITION OF ACQUIREMENT DATA' are 10, I, key word (always), and file 1, respectively. In respect to the field 'NAME', the designated 'CHARACTER LENGTH', 'ATTRIBUTE', 'INTERVAL', and 'STORAGE POSITION' are 30, C, once in a year, and file 1, respectively. In respect to the field 'AGE', the designated 'CHARACTER LENGTH', 'ATTRIBUTE', 'INTERVAL', and 'STORAGE POSITION' are 3, I, twice every year, and file 1, respectively. In respect to the field 'SALARY', the designated 'CHARACTER LENGTH', 'ATTRIBUTE', 'INTERVAL', and 'STORAGE POSITION' are 7, I, twice every year, and file 1, respectively. In any case, 'EFFECTIVE PERIOD' is unfixed. It is a matter of course that the 'EFFECTIVE PERIOD' may be registered as 30 years or 40 years.

When generation management information is registered/updated, corresponding generation management information together with data-base definition information is indicated on the display unit 1. Accordingly, generation management information can be updated/registered by rewriting an arbitrary column for generation management information or filling a blank column.

Figure 3:
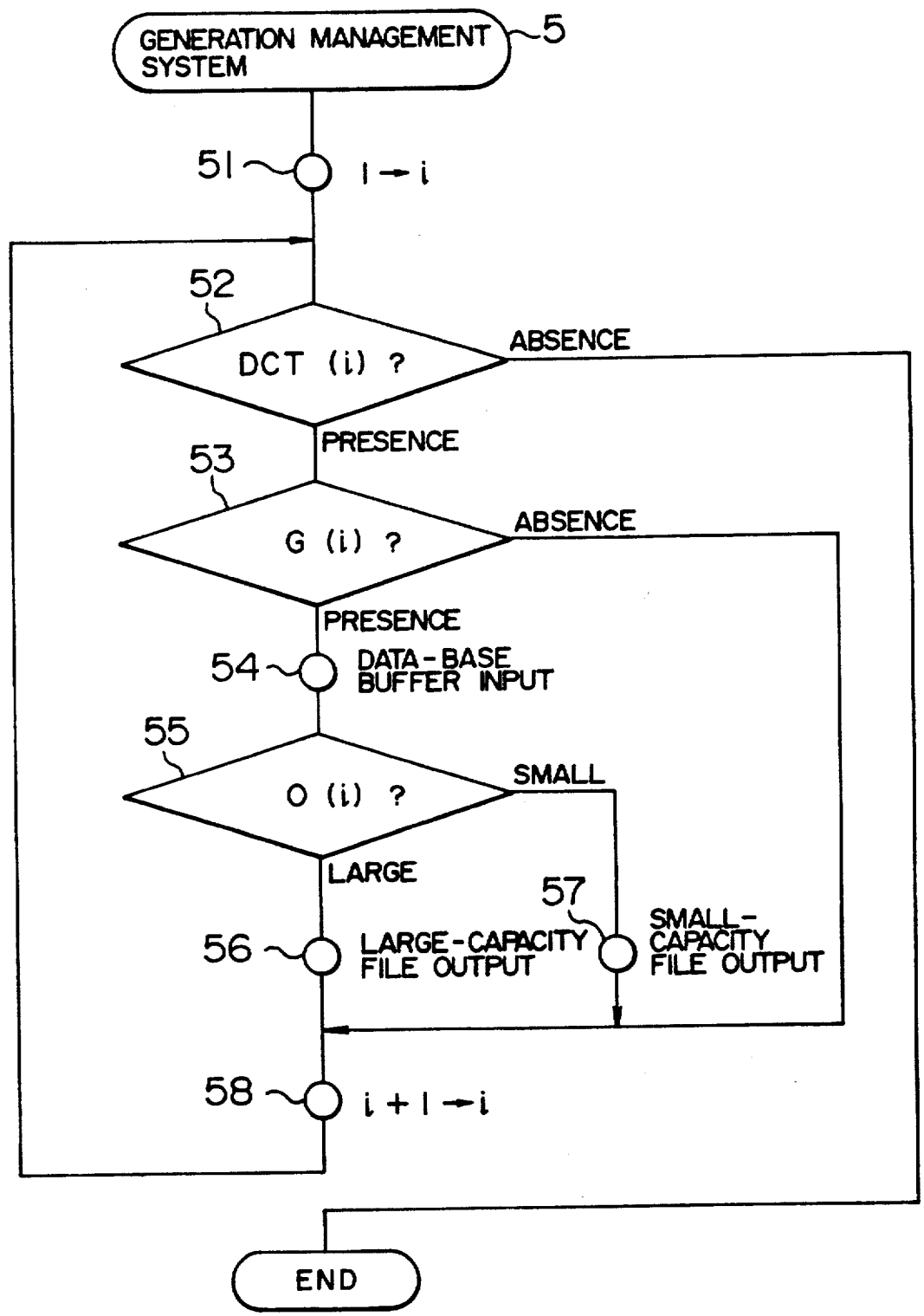
FIG. 3 is a flow chart showing the operation of the generation management system in FIG. 1.

FIG. 3 shows in a flow chart the operation of the generation management system.

First, the value i of a counter constituted by a program in the generation management system 5 is initialized (Step 51). Then, a judgment is made as to whether or not field information DCT(i) in generation management information exists (Step 52). Assuming now that the field information DCT includes 'NAME NUMBER', 'NAME'. AGE' and 'SALARY' as shown in FIG. 2 and that the value i of the counter successively changes to 1, 2, 3 and 4, then the field information DCT(i) successively changes to 'NAME NUMBER', 'NAME', 'AGE' and 'SALARY'. In short, the same procedure is repeated four times. When field information DCT(i) exists, a judgment is made as to whether or not generation information acquirement designation G(i) corresponding to the field information (for example, DCT(1) as 'NAME NUMBER') exists (Step 53). When G(i) exists, the field information is received from the data-base buffer 6 (Step 54). In the case of FIG. 2, 'NAME NUMBER', 'NAME'. 'AGE', and 'SALARY' are designated to be acquired at an interval of every time (as key word), an interval of once a year, an interval of once a year, and an interval of twice a year, respectively. In short, the respective field information is acquired in the timing designated by the user (for example, 31th March every year, while in the case of the interval of twice a year, 31th March and 30th September). Then, a judgment is made as to whether or not designation of storage position O(i) in a file 7 or 8, of a data corresponding to the field information exists (Step 55). The data is fed to the large-capacity file 7 (Step 56) or fed to the small-capacity file 8, based on the judgment. In FIG. 2, since the generation information is of a low update frequency and a low reference frequency the storage position is designated to file 1, that is, the large-capacity file 7. When the data output for writing data in these files is finished, the counter is increased (Step 58). Then, the situation in the procedure is returned. After the same procedure is repeated by the number of the field information, the procedure is terminated.

In the following, an application of this embodiment is described.

(1) When plural pieces of generation information are managed for a data base, the storage position of generation data can be changed correspondingly to the data item and generation management level. In short, though data corresponding to all the fields in FIG. 2 are stored in the same file, the storage position can be changed by the field information so that the data of 'NAME NUMBER' and 'NAME', the data of 'AGE' and the data of 'SALARY' are stored in file 1, file 2 and file 3, respectively. Or, the storage position can be changed by the generation management level so that the data of 'NAME' and 'AGE' at the interval of once a year and the data of 'SALARY' at the interval of twice a year are stored in file 1 and file 2, respectively.

(II) The dictionary device is provided to designate generation management information by item. When, for example, one field 'NAME' in FIG. 2 is designated, the length and attribute of data-base definition information corresponding to the 'NAME' and the interval, storage position and effective period of generation management information corresponding to the 'NAME' are indicated on the display unit so that items can be successively shifted after designation, to thereby prevent error in registration/designation.

(III) The storage position can be changed in accordance with the dictionary device for managing generation management information, the disk device for managing generation information, and the level of the generation information. In short, storage positions corresponding to dictionary device A, B and C can be designated to files 1, 2 and 3, respectively. Or, storage positions corresponding to disk devices A, B and C of the data base can be designated to files 1, 2 and 3, respectively. Or, storage positions corresponding to the intervals of generation information of 'one year', 'two years' and 'three years or more' can be designated to files 1, 2 and 3, respectively.

(IV) All the pieces of generation information are arranged in an extension memory or IC disk so that these pieces of generation information can be written in an optical disk at a specific point of time. In short, the low-speed, large-capacity file 7 in FIG. 1 can be constituted by an optical disk. First, generation information is recorded in the extension memory or the IC disk as the high-speed, small-capacity file 8 without being written in the optical disk. At the point of time the memory capacity becomes insufficient, the information is transferred to the optical disk.

(V) A function of adjusting the interval corresponding to the capacity of the generation information data set (file) is provided. Further, a method of reserving an undescribed record as generation information is used. When, for example, the capacity proportion of data storage files 1, 2 and 3 is 1:2:3, the intervals are adjusted so that the data at the interval of 'three years or more', the data at the interval of 'two years' and the data at the interval of 'one year' are stored in the files 1, 2 and 3, respectively. For example, an undescribed record such as a record journal (log) can be reserved as generation information in the file 7 or 8.

(VI) Generation information can be distributed/managed through a network. In this case, generation information low in frequency of access are distributed from a center system to local systems.

(VII) The unit for calling generation information is generalized by using an artificial intelligence (AI) technique. When, for example, 'year' as a settlement term in a company is given, the unit is so generalized that information in a range from the year's April to the next year's March can be taken out.

Further, the system is designed to indicate a generation acquirement status. For example, a generation number is indicated by designating an item as an acquirement target. More specifically, the number of addresses changed is indicated by designating the item of 'ADDRESS'.

(VIII) A decision making support system such as a management system using generation information classified by item is constructed. In short, the support system is provided to operate the data-base system smoothly. The support system has functions such as initial generation of a data base, reconstruction in view of updating information, backup timing designation for a measure counter to failure, graphic operation monitor, and the like. The generation information classified by item can be utilized when these operations are carried out.

(IX) In a bank on-line system, the undescribed record is reserved as generation information. In short, the undescribed record such as a record journal or the like is reserved as log information to make generation information.

As described above, according to the embodiment, the generation management of a data base is controlled by the dictionary device. Accordingly, the acquirement method of generation information and the storage position thereof can be adjusted easily in accordance with necessity. Further, the generation information of the data base can be acquired at an arbitrary time. As a result, a plurality of generations can be managed generally.

Figure 4:
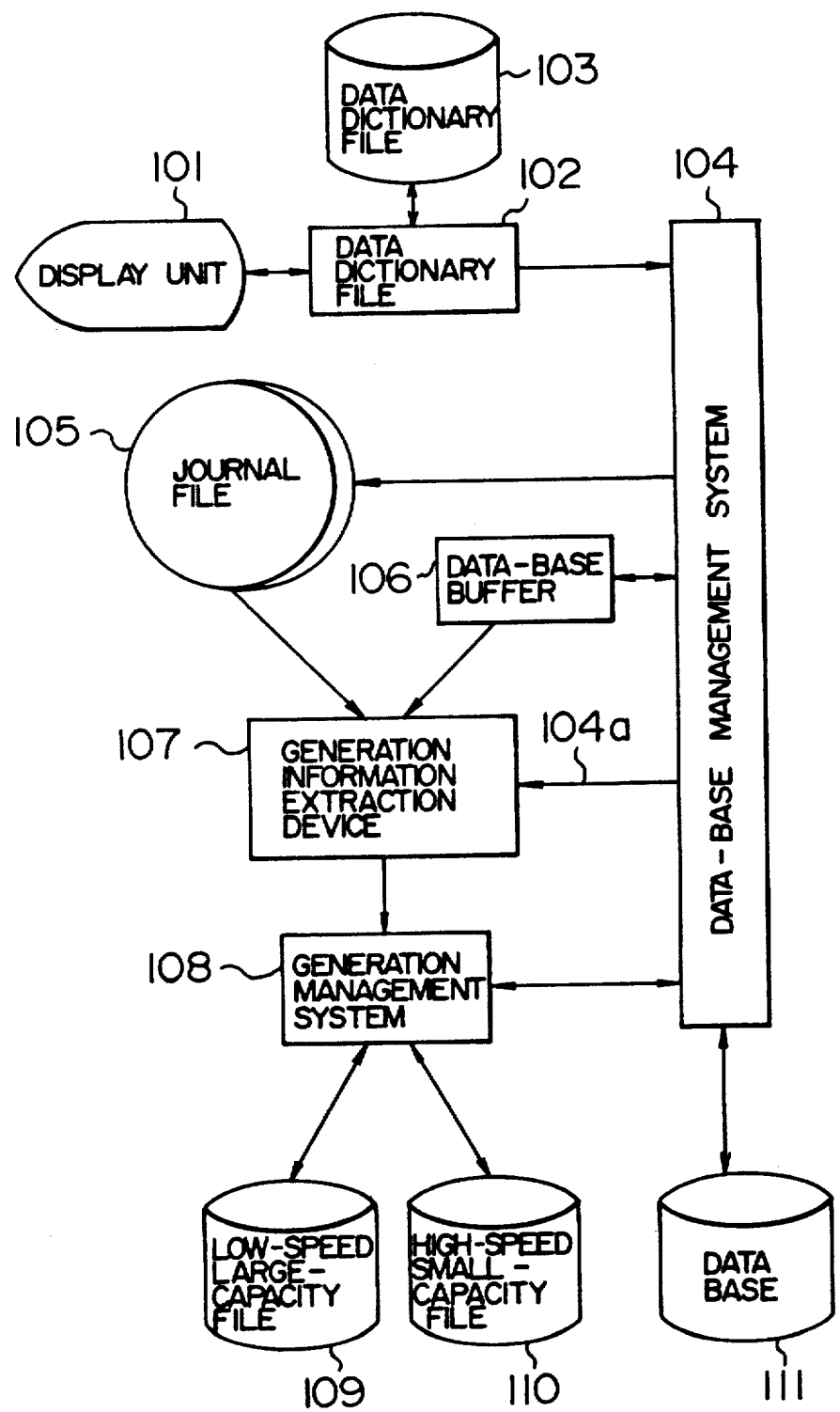
FIG. 4 is a block diagram of a data-base system including a data-base generation information extracting means, showing another embodiment of the invention.

FIG. 4 is a block diagram of a data-base generation information extraction type system as another embodiment of the invention. In FIG. 4, the data-base generation information extraction type system comprises: a display unit 101, a data dictionary device 102; a data dictionary file 103, a data-base management system (DBMS) 104, a journal (log) file 105, a data-base buffer 106, a generation information extracting device 107, a generation management system 108, generation information storage portions 109 and 110 which are a low-speed large-capacity file and a high-speed small-capacity file respectively, and a data base 111.

Generation information in a data base is registered/updated as follows. The user sends a request from the display unit 101 to the data dictionary device 102 to call "definition information (a certain figure in a code data is defined to express a data item in the data base, for example, any one of 'GOODS CODE', 'UNIT PRICE', 'TOTAL SHIPMENT' and 'TOTAL STOCK') in the data base for generation management" from the data dictionary file 103. The user designates generation management information as definition information indicated on the display unit 101 and registers it in the data dictionary file 103 in advance through the data dictionary device 102.

Figures 5, 6:
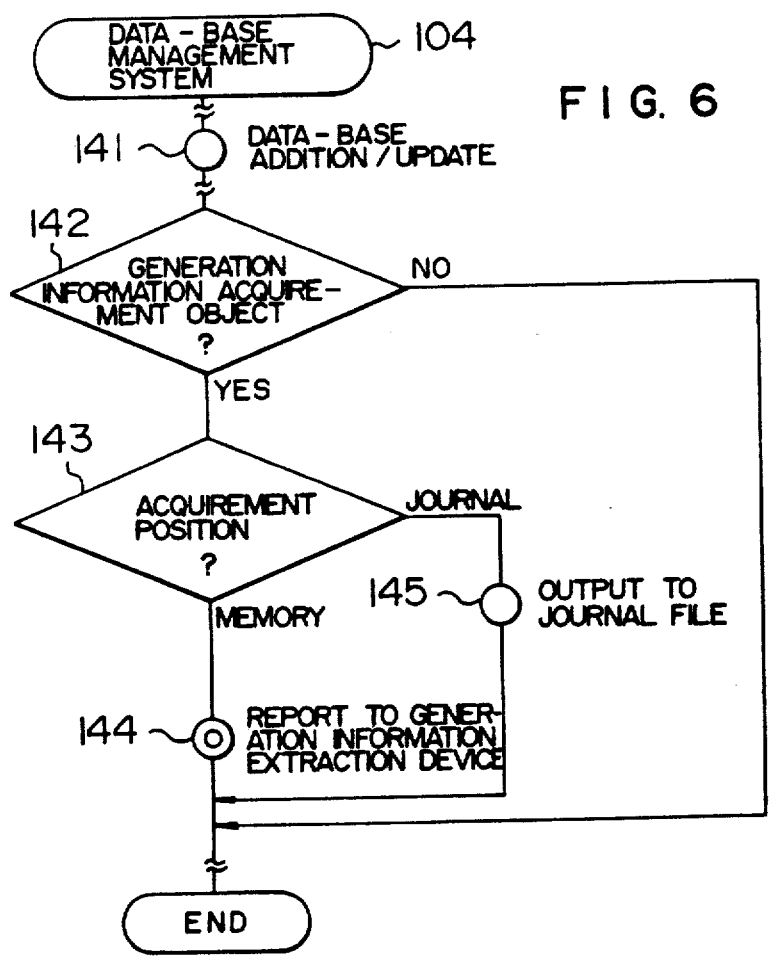

FIG. 5 is a diagram showing an example of a format of generation management information preliminarily registered in the data dictionary file 103. For example, FIG. 5 shows an inventory management table generated for respective goods. The portions of 'FIELD' 121, '(FIELD) LENGTH' 122 and 'ATTRIBUTE' (in which I expresses an integer attribute, and C expresses a character attribute) are data portions which are ordinarily free from updating. These portions correspond to the definition information for the data base. The portions of 'INTERVAL' 124 (including information for determining an interval of acquisition of read-out key information and generation information), 'ACQUIREMENT POSITION' 125 for judging whether information is acquired from the journal 105 or from the data-base buffer 106, 'STORAGE POSITION' 126 for judging whether generation information is stored in the file 109 or in the file 110 and 'EFFECTIVE PERIOD' 127 are data portions (acquirement portions) which are updated. As described above, the user calls a table of data 121–123 from the data dictionary file 103. In addition to this, the user designates necessary generation management information of data 124–127 and registers in the data dictionary file 103 in advance.

Then, the data-base management system 104 sends the contents of the data base 111 in the data-base buffer 106 to the journal file 105 (through the data-base management system 104) or sends a direct extraction request to the generation information extracting means, based on the generation management information registered in the data dictionary file 103.

Necessary generation information in the generation information sent to the journal file 105 is extracted by operating the generation information extracting device 107 in a batch processing and sent to the generation management system 108. Or, when the direct extraction request 104a from the data-base management system 104 is given to the generation information extracting device 107, the generation information extracting device 107 extracts necessary generation information from the data-base buffer 106.

The generation information extracting device 107 issues a request to the generation management system 108 to store the extracted generation information in the generation information file 109 or 110.

The generation management system 108 stores the generation information in the low-speed large-capacity file 109 or in the high-speed small-capacity file 110 based on the generation management information such as for example 'STORAGE POSITION' 126. The high-speed small-capacity file 110 is a file memory which has a relatively small capacity and is suitable for high-speed access to see generation information frequently. The low-speed large-capacity file 109 is a file memory for storing such generation information that is seen only once a year. The contents of the file 110 can be transferred to the file 109 in a suitable interval, for example, once a half year.

As described above, according to the embodiment, the data dictionary file 103 and the data dictionary device 102 for managing generation information are provided to make it possible to designate 'INTERVAL' 124, 'ACQUIREMENT POSITION' 125 and 'STORAGE POSITION' 126 of the generation management information (FIG. 5) freely.

FIG. 6 shows in a flow chart an example of generation information acquirement processing in the data-base management system 104 In FIG. 6, after addition/updating of the data base (Step 141), a judgment is made as to whether or not the data (record unit) is a generation information acquirement target (Step 142). When the data is a record containing a field as an acquirement target, a judgment as to 'ACQUIREMENT POSITION' 125 is made (Step 143). When the journal is the acquirement position, the data, that is, the record, is extracted and sent to the journal file 105 (Step 145). When the memory (data-base buffer) is the acquirement position 125, the data (record) is reported to the generation information extracting device 107 (Step 144).

Figure 7:
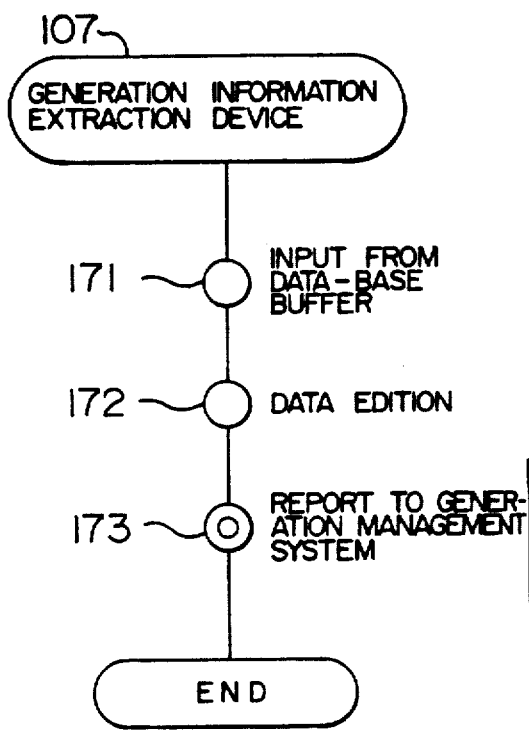

FIG. 7 shows in a flow chart an example of the extraction procedure from the memory (data-base buffer) in the procedures in the generation information extracting device 107. In FIG. 7, data are received from the data-base buffer 106 (Step 171) based on the detection of reporting 144 to the generation information extracting device 107 of the data-base management system (FIG. 6). Then, fields as a target of generation information management are extracted from the data and edited (Step 172). Then, the result of the edition is reported to the generation management system 108 (Step 173).

Figure 8:
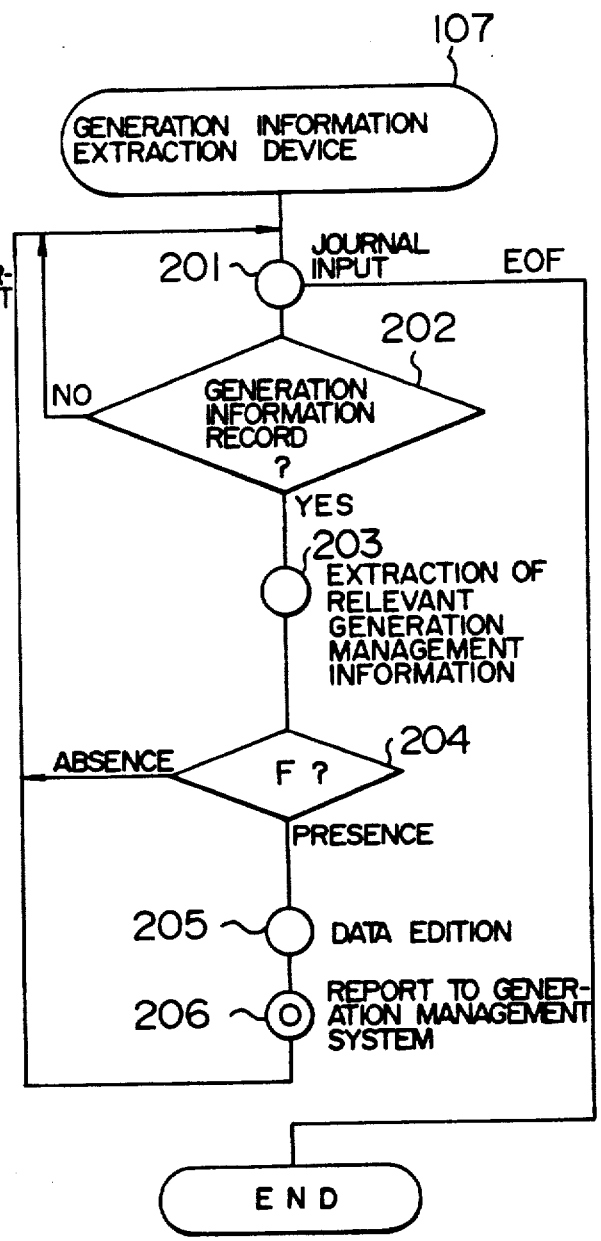
FIG. 8 is a flow chart for explaining a method for extracting generation information from a journal (log) file.

FIG. 8 shows in a flow chart an example of the extraction procedure from the journal file 105 in the procedures in the generation information extracting device 107. The generation information extracting device 107 receives data from the journal file 105 (Step 201). Then, a judgment is made as to whether or not the data is a generation information record (Step 202). When the data is out of generation information, for example, when the data is a statistical data, nothing but reading is made. When the data is a generation information record, generation management information corresponding to the relevant generation information record is extracted from the data dictionary file 103 (Step 203). Then, the designation contents of the field information F in the generation information is judged by the DBMS 104 (Step 204). When fields as a target of generation information management exist, the fields are extracted from the generation information record and edited (Step 205). Then, the result of the edition is reported to the generation management system (Step 206).

The procedure of the steps 201-206 is repeated for all data in the journal file 105 and then terminated.

In the aforementioned embodiment, generation information data may be sent to the generation information data base, that is, the low-speed large-capacity file 109 and the high-speed small-capacity file 110, at the time of on-line execution independently of the journal output.

Although the aforementioned embodiment has shown the case where generation information is stored by using an exclusive-use data base containing files 109 and 110, the invention can be applied to the case where generation information may be stored in an inter-grating area provided in the data base 111 formed of the same medium as the data-base management system.

In the case where the embodiment is applied to a distributed processing system, journals including generation information distributed to nodes are entered through the network to match generation information between the nodes of a network.

Although the embodiment has shown the case where the method for acquirement/extraction of generation information is determined based on the designation of generation information acquirement from the user, the invention can be applied to the case where the method for collections, extraction and storage of generation information data may be determined automatically correspondingly to the on-line load without the designation of generation information acquirement from the user. For example, the extracting method can be changed so automatically that generation information extraction is made in the rate of once to ten times of updating in a time zone of large on-line load, that is, in a time zone of frequent updating, and that generation information extraction is made in the rate of once to twice of updating in a time zone of small on-line load, that is, in a time zone of nonfrequent updating.

As described above in detail, according to the embodiment, the generation management of a data base can be controlled by the data dictionary device. Accordingly, the generation information acquirement method, as to the acquirement time, the acquirement interval, the acquirement position and the storage position, can be adjusted easily.

Further, there are provided two generation information extracting systems, namely, real-time processing by the data-base buffer and batch processing by the journal file. Accordingly, there arises an effect in that an operation method suitable for the level (as to whether the data is seen frequently) of generation information to be managed can be selected.

What is claimed is:

1. In a data-base system comprising a data-base management system, dictionary means for managing definition information and generation management information in a data base, and a dictionary file for storing said generation management information in said definition information, a data-base generation management method comprising the steps of:

providing a generation management system between said data-base management system and a data storage file to acquire data in accordance with the generation management information;

making said dictionary means independent from said data-base management system and connecting said dictionary means to an input/output device, said dictionary file and said data-base management system;

designating the generation management information for each item thereof in said dictionary file through said input/output device so as to register the designated generation, management information as new or updated registration in said dictionary file by means of said dictionary means while the timing for acquiring the generation management information is designated at a desired value; and operating said data-base management system to issue a data-base output request to said generation management system based on the generation management information registered in said dictionary file to thereby make said generation management system read out data from the data base in accordance with the registered generation management information to supply the read-out data to the designated data storage file.

2. A data-base generation management method according to claim 1, in which when new or update generation management information is registered, said dictionary means changes the connection of the data storage file according to the item and generation management level of the registered generation information by performing update designation of the data storage file.

3. A data-base generation management method according to claim 1, in which said generation management system includes an extension memory or an IC disk for storing the registered generation information preliminarily so as to transfer the registered generation information from said extension memory or said IC disk to a large-capacity optical disk at a predetermined point of time.

4. A data-base generation management method according to claim 1, in which said dictionary means changes an interval value which is provided in the registered generation management information to determine an interval of data acquirement, corresponding to the capacity of the connected data storage file.

5. A data-base generation management method according to claim 1, in which a unit of generation information call used in said dictionary means is generalized in the form of knowledge information so that year data can be taken out corresponding to the call of year, and in which said dictionary means serves to indicate a generation acquirement status.

6. A data-base generation management method according to claim 1, in which data itemized by the generation information are distributed and managed into local files through a network, and in which an undescribed record such as a recorder journal is preserved as generation information.

7. A data-base generation management system comprising:
   a data-base management system;
   a dictionary means for managing definition information and generation management information in a data base;
   a dictionary file for storing said definition information and said generation management information;
   generation management system means provided between said data-base management system and a data storage file, for performing control to acquire data according to generation management information;
   connection means for connecting said dictionary means to an input/output device, said dictionary file and said data-base management system so as to make said dictionary means independent of said data-base management system;
   registration executing means provided in said dictionary means and for registering new or update generation management information in said dictionary file by means of said dictionary means when the new or update generation information classified by each item is designated through said input/output device while the timing for acquiring the generation management information is designated at a desired value; and
   means for providing a control program to operate said data-base management system to issue a data-base output request to said generation management system based on the generation management information registered in said dictionary file to thereby make said generation management system read out data from the data base according to the registered generation management information to supply the read-out data to be designated storage file.

8. A data-base generation management system comprising: data dictionary means for managing generation management information in definition information in a data base; designation means for designating an acquirement timing for generation management information registered by said data dictionary means; update data holding means for holding update data acquired in said data base management system; extraction means for extracting necessary generation information from said update data; and a storage means for storing the extracted generation information; the extraction timing of the generation information extracted by said extraction means being controlled based on the generation information acquirement timing designated by said designation means.

9. A data-base generation management system according to claim 8, in which said designation means is constituted so as to designate the generation information acquirement timing and position in the generation management information registered by said data dictionary means, and in which the update data holding means includes a data-base buffer for temporarily holding update data obtained in said data-base management system at the time of execution of on-line operation, and a journal file for holding a journal obtained in said data-base management system, by which the generation information is extracted through selected one of the data-base buffer and the journal file in accordance with the designated generation information acquirement position.

* * * * *